UNITED STATES PATENT OFFICE.

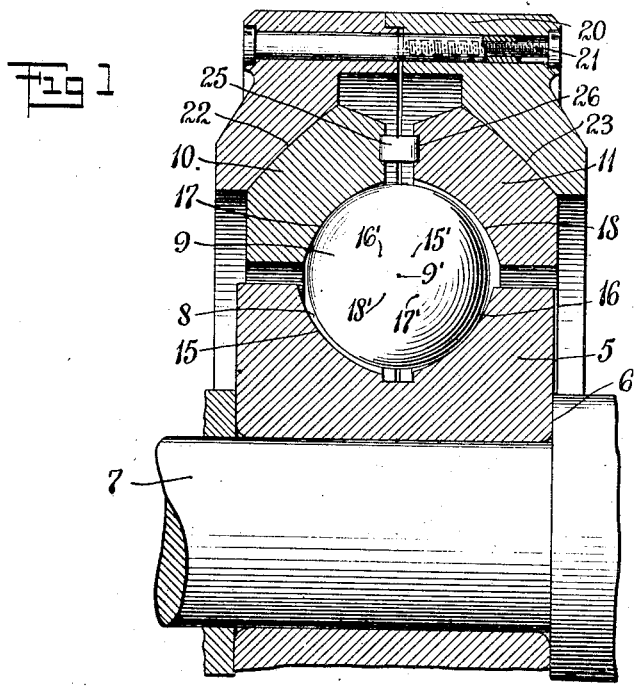
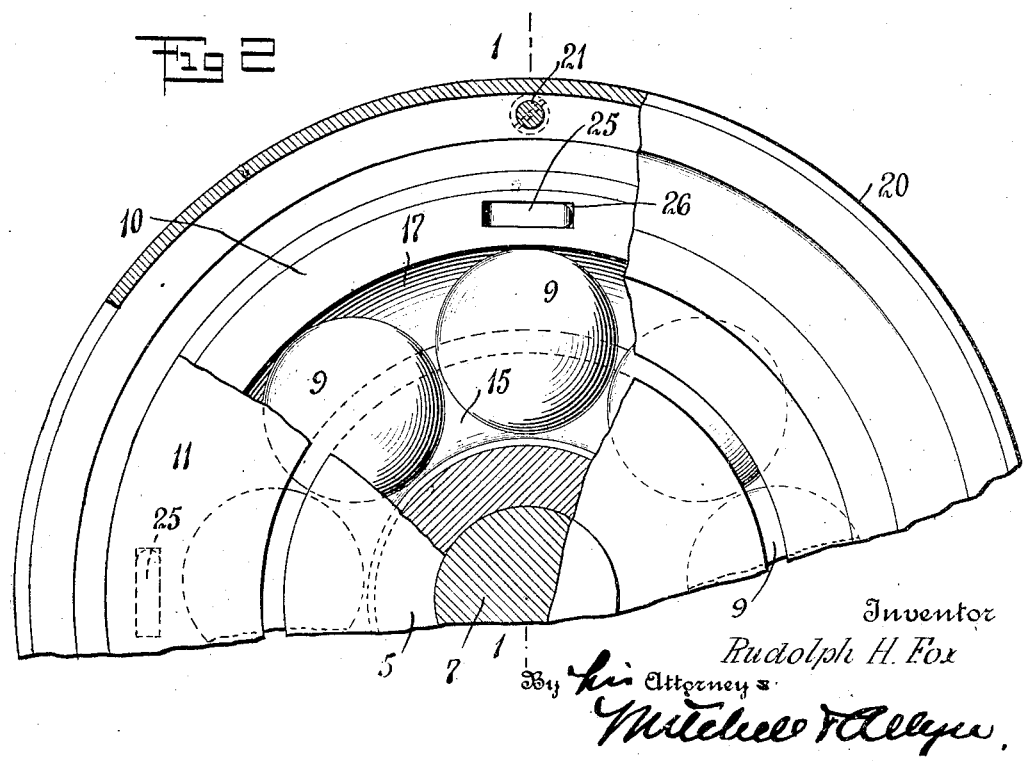

RUDOLPH H. FOX, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

BALL-BEARING.

1,195,952.

Specification of Letters Patent.

Patented Aug. 22, 1916.

Application filed November 1, 1915. Serial No. 58,945.

*To all whom it may concern:*

Be it known that I, RUDOLPH H. FOX, a citizen of the United States of America, residing at New Britain, Connecticut, have invented a new and useful Ball-Bearing, of which the following is a specification.

My present invention relates particularly to thrust bearings, and a special object of the invention is to provide a bearing of this character in which the thrust in both directions will be taken care of by a single row of balls.

Another object is to provide a bearing of this character which can be handled as a single unit.

Other objects are to provide a bearing of compact, simple, inexpensive and practical construction, and having a high load carrying capacity.

In the accomplishment of these objects, I employ an inner thrust member and a pair of thrust rings surrounding the same together with a single row of thrust receiving balls interposed between the inner thrust member and the two thrust rings, and construct the inner thrust member and the thrust rings with bearing faces or tracks for the balls disposed diametrically opposite in respect to the balls, whereby to take the thrust in both directions.

Other features of the invention and the details of construction will appear as the specification proceeds.

In the accompanying drawing I have illustrated the invention embodied in the practical and preferred form and I would have it understood that changes and modifications may be made without departing from the true spirit and scope of the invention.

In this drawing: Figure 1 is a cross sectional view of the upper half of a thrust bearing embodying the invention, taken substantially on the plane of the line 1—1 of Fig. 2. Fig. 2 is a side view of the same with parts broken away.

In the illustration, the inner thrust member 5 is in the form of a ring, adapting it to be engaged against a shoulder 6 on the shaft element 7. This thrust member is formed with an annular channel 8 in its periphery to receive the single row of balls 9.

The two thrust rings are designated 10 and 11 respectively. These thrust rings, as shown, surround the inner thrust member and are disposed at opposite sides of the channel therein so as to engage the balls at opposite sides thereof. The opposite side walls defining the channel in the inner thrust member are formed as ball tracks 15 and 16 and the faces of the thrust rings confronting the balls are formed as ball tracks 17 and 18. The ball tracks of the thrust rings are disposed at diametrically opposite sides of the balls from the ball tracks on the thrust ring, so that the thrust will be through the centers of the balls. Thus, the ball race or track 17 on the thrust ring 10 is diametrically opposite the ball track 16 on the inner thrust member, and the ball track 18 of the other thrust ring is diametrically opposite the other ball track 15 of the inner thrust member.

The thrust of the thrust rings is taken up by a housing surrounding said rings and consisting in the present disclosure of a two-part casing 20 made cylindrical in form so as to be in the nature of a bushing which can be readily mounted in the machine or mechanism to which the bearing is to be applied. The two parts of the casing are held together by suitable fastenings such as the screws 21. The inside walls of the housing are formed with oppositely disposed bearing faces 22 and 23 borne against by the respective thrust rings 10 and 11, and these engaging surfaces are preferably shaped so as to cause the thrust bearing to accommodate itself to the radial bearing which supports the shaft, they being for this purpose curved or drawn on the arc of a circle in the present disclosure.

The ball tracks are so constructed that when the thrust is in one direction, and this thrust is being taken care of by one set of diagonally opposite ball tracks, the other or idle set of ball tracks will be free of engagement with the balls. The necessary clearance is provided in the present disclosure, and the bearing is made more or less self-adjusting in its nature by forming the thrust ring ball tracks 17 and 18 as arcs drawn from the centers 17' and 18' located below and on opposite sides of the ball centers 9', and by forming the ball tracks 15—16 of the inner thrust member as arcs drawn from the centers 15' and 16' located above and on opposite sides of the ball centers 9'.

The operation of the bearing will be clear from the foregoing, it being seen that when the thrust, say of shaft 7, is in the direction indicated by the arrow, the end pressure will be from the shoulder 8 on the shaft to the inner thrust member 5 and across from the ball track 16 and balls 9 to the diagonally opposite track 17 on the thrust ring 10 and from said thrust ring to the housing. In this case the ball track 15 of the inner thrust member has been carried toward the left far enough to free it of the balls and the balls have been shifted to the left to free them of the thrust ring 11. To hold the thrust rings under control, and to prevent the free or idle thrust ring in such a case from dropping down on to the rotating balls, means are preferably provided for yieldingly holding the thrust rings in engagement with the bearing faces in the housing. This means consists in the present illustration of a series of spring metal spreaders 25 interposed between the thrust rings and serving to force the thrust rings apart into engagement with the backing surfaces 22 and 23. These spreaders are shown seated in pockets 26 provided in the opposing faces of the rings, they being thereby held properly in place. It will be understood that when the thrust is in the reverse direction, the other set of diagonally opposite bearing faces 15—18 will come into action and the first set of bearing faces will be freed of engagement with the balls.

It will be seen from the foregoing, that the bearing of my invention is very simple and durable in its construction, is extremely compact and can by reason of the fact that the balls when in place act as a connecting medium to retain the inner thrust member within the bearing, be handled and installed as a single unit.

What I claim is:

1. A single row double thrust ball bearing comprising, a thrust member having a channel in its periphery to receive the row of balls, two thrust members concentrically disposed with respect to said first thrust member at opposite sides of the channel therein, a single row of balls engaged in said channel and between said two thrust members, said first thrust member having thrust bearing surfaces at the opposite sides of the channel therein and said second thrust members having bearing surfaces diagonally opposite said thrust bearing surfaces, the diagonally opposite bearing surfaces being arranged to engage the interposed balls when the thrust is in one direction and to clear the balls when the thrust is in the opposite direction.

2. A single row double thrust ball bearing comprising a thrust member having a channel in its periphery to receive the row of balls, two thrust members concentrically disposed with respect to said first thrust member at opposite sides of the channel therein, a single row of balls engaged in said channel and between said two thrust members, said first thrust member having thrust bearing surfaces at the opposite sides of the channel therein and said second thrust members having bearing surfaces diagonally opposite said thrust bearing surfaces, the diagonally opposite bearing surfaces being arranged to engage the interposed balls when the thrust is in one direction and to clear the balls when the thrust is in the opposite direction and means for supporting which ever one of the two thrust members is free to thrust out of contact with the balls.

3. A single row double thrust unit ball bearing comprising a thrust member channeled on its periphery to receive a row of balls and provided with thrust bearing faces at opposite sides of said channel, a single row of balls in said channel and arranged to engage one or the other of said bearing faces in accordance with the direction of thrust, thrust rings at opposite sides of said row of balls surrounding the thrust member but free of engagement therewith, said thrust rings having opposed bearing faces diametrically opposite the bearing faces of the channeled thrust member to form in connection therewith ball races for the balls to take the thrust in opposite directions, a housing surrounding the thrust rings having oppositely disposed internal bearing faces engaged by the two thrust rings, and means yieldingly holding the thrust rings engaged with the internal bearing faces of the housing.

4. A single row double thrust unit ball bearing comprising a thrust member channeled on its periphery to receive a row of balls and provided with thrust bearing faces at opposite sides of said channel, a single row of balls in said channel and arranged to engage one or the other of said bearing faces in accordance with the direction of thrust, thrust rings at opposite sides of said row of balls surrounding the thrust member but free of engagement therewith, said thrust rings having opposed bearing faces diametrically opposite the bearing faces of the channeled thrust member to form in connection therewith ball races for the balls to take the thrust in opposite directions, a housing surrounding the thrust rings having oppositely disposed internal bearing faces engaged by the two thrust rings and yielding spreading means interposed between and normally forcing the two thrust rings apart.

5. A single row double thrust ball bearing comprising an inner thrust member having a channel in its periphery to receive a row of balls, two thrust rings surrounding said thrust member and disposed at opposite sides of the channel therein, a single row of balls engaged in the channel and between the thrust rings, said inner thrust member having thrust bearing surfaces at the opposite sides of the channel therein and said thrust rings having bearing surfaces diagonally opposite said thrust bearing surfaces, the diagonally opposite bearing surfaces being arranged to engage the interposed balls when the thrust is in one direction and to clear the balls when the thrust is in the opposite direction and a housing around the thrust rings having opposed bearing surfaces to be engaged by said thrust rings.

6. A single row double thrust ball bearing comprising an inner thrust member having a channel in its periphery to receive a row of balls, two thrust rings surrounding said thrust member and disposed at opposite sides of the channel therein, a single row of balls engaged in the channel and between the thrust rings, said inner thrust member having thrust bearing surfaces at the opposite sides of the channel therein and said thrust rings having bearing surfaces diagonally opposite said thrust bearing surfaces, the diagonally opposite bearing surfaces being arranged to engage the interposed balls when the thrust is in one direction and to clear the balls when the thrust is in the opposite direction, a housing around the thrust rings having opposed bearing surfaces to be engaged by said thrust rings, and means for supporting the ring which is free of thrust out of contact with the balls.

7. A single row double thrust ball bearing comprising an inner thrust member having a channel in its periphery to receive a row of balls, two thrust rings surrounding said thrust member and disposed at opposite sides of the channel therein, a single row of balls engaged in the channel and between the thrust rings, said inner thrust member having thrust bearing surfaces at the opposite sides of the channel therein and said thrust rings having bearing surfaces diagonally opposite said thrust bearing surfaces, said thrust ring bearing surfaces being formed on arcs whose centers are located below and on opposite sides of the centers of the balls and the opposed bearing surfaces of the inner thrust member being formed on arcs whose centers are located above and on opposite sides of the centers of the balls.

8. A single row double thrust ball bearing comprising an inner thrust member having a channel in its periphery to receive a row of balls, two thrust rings surrounding said thrust member and disposed at opposite sides of the channel therein, a single row of balls engaged in the channel and between the thrust rings, said inner thrust member having thrust bearing surfaces at the opposite sides of the channel therein and said thrust rings having bearing surfaces diagonally opposite said thrust bearing surfaces, said thrust ring bearing surfaces being formed on arcs whose centers are located below and on opposite sides of the centers of the balls and the opposed bearing surfaces of the inner thrust member being formed on arcs whose centers are located above and on opposite sides of the centers of the balls, and a housing around the thrust rings having opposed internal bearing surfaces to be engaged by said rings.

9. A single row double thrust ball bearing comprising an inner thrust member having a channel in its periphery to receive a row of balls, two thrust rings surrounding said thrust member and disposed at opposite sides of the channel therein, a single row of balls engaged in the channel and between the thrust rings, said inner thrust member having thrust bearing surfaces at the opposite sides of the channel therein and said thrust rings having bearing surfaces diagonally opposite said thrust bearing surfaces, the diagonally opposite bearing surfaces being arranged to engage the interposed balls when the thrust is in one direction and to clear the balls when the thrust is in the opposite direction, a housing around the thrust rings having opposed bearing surfaces to be engaged by said thrust rings, said thrust rings having pockets in the opposite faces thereof and spreaders interposed between the thrust rings and seating in said pockets.

10. In a bearing of the character set forth, the combination of a housing having opposed bearing faces therein, opposed thrust members loosely confined within said housing having opposed thrust bearing surfaces and adapted to freely seat themselves to a bearing against the opposed bearing faces inside the housing, a channeled member having thrust bearing surfaces at the opposite sides of the channel therein disposed diagonally opposite the thrust bearing surfaces on the two thrust members and a single row of balls confined in the channel and between the two thrust members.

RUDOLPH H. FOX.